United States Patent [19]

Takahashi

[11] Patent Number: 5,424,116
[45] Date of Patent: Jun. 13, 1995

[54] ELECTRICALLY CONDUCTING PLOYESTER MATERIAL AND PROCESS OF PRODUCING SAME

[75] Inventor: Kiyofumi Takahashi, Yahata, Japan

[73] Assignee: Nippon Sanmo Sensyoku Co., Ltd., Japan

[21] Appl. No.: 148,365

[22] Filed: Nov. 8, 1993

[30] Foreign Application Priority Data

Apr. 13, 1993 [JP] Japan .................. 5-110043

[51] Int. Cl.⁶ .......................... B32B 3/00; B32B 7/00; B32B 15/00
[52] U.S. Cl. ................... 428/209; 427/121; 427/126.1; 427/301; 427/307; 427/322; 428/379; 428/395; 428/458
[58] Field of Search .............. 427/96, 307, 299, 301, 427/126.1, 400, 121, 322; 428/209, 379, 395, 458

[56] References Cited

U.S. PATENT DOCUMENTS

| | | | |
|---|---|---|---|
| 4,378,226 | 3/1983 | Tomibe | 8/115.66 |
| 4,681,820 | 7/1987 | Tomibe | 427/301 |
| 4,690,854 | 9/1987 | Tomibe et al. | 428/195 |
| 5,269,973 | 12/1993 | Takahashi | 427/419.1 |

FOREIGN PATENT DOCUMENTS

| | | |
|---|---|---|
| 0035406 | 9/1981 | European Pat. Off. . |
| 0086072 | 8/1983 | European Pat. Off. . |
| 0115661 | 8/1984 | European Pat. Off. . |
| 0217987 | 4/1987 | European Pat. Off. . |
| 0336304 | 10/1989 | European Pat. Off. . |
| 0503189 | 9/1992 | European Pat. Off. . |
| 28370 | 3/1979 | Japan .................. 427/301 |
| 3014879 | 1/1988 | Japan .................. 427/307 |

*Primary Examiner*—Michael Lusignan
*Attorney, Agent, or Firm*—Lorusso & Loud

[57] ABSTRACT

An electrically conducting material is produced by a process which includes a step of treating a polyester substrate with an aqueous alkali solution to dissolve a portion of the polyester substrate into the solution. The resulting substrate is then reacted with a compound containing a group which can capture copper ion to introduce the copper ion capturing groups in the substrate. The copper ion-capturing group-containing substrate is thereafter treated with a source of copper ion and a sulfidizing agent to form copper sulfide bound to the polyester substrate.

12 Claims, No Drawings

ELECTRICALLY CONDUCTING PLOYESTER MATERIAL AND PROCESS OF PRODUCING SAME

This invention relates to an electrically conducting polyester material and to a process of producing same.

U.S. Pat. No. 4,378,226 discloses a method of producing electrically conducting polymeric fibers (such as polyester fibers) which includes the steps of introducing cyano groups into polymeric fibers by graphting acrylonitrile thereonto, and treating the resulting polymeric fibers with a source of cuprous ion and a sulfur-containing compound to form copper sulfide bound to the polymeric fibers. U.S. Pat. No. 4,690,854 discloses an electrically conducting polymeric material which includes a polymeric substrate (such as polyester substrate) containing mercapto, thiocarbonyl, quaternary ammonium salt, amino or isocyanato groups, and copper sulfide bound to the polymeric substrate.

While the above electrically conducting polyester materials have an excellent electrical conductivity, they have a problem that the electrical conductivity gradually decreases when subjected to wearing conditions.

The present invention has been made to solve this problem.

In accordance with one aspect of the present invention there is provided a process for the preparation of an electrically conducting material, comprising the steps of:

(a) treating a polyester substrate with an aqueous alkali solution to dissolve a portion of the polyester substrate into said solution and to obtain a treated substrate, (b) reacting said treated substrate with a compound containing a group which can capture copper ion to obtain a copper ion capturing group-containing substrate, and (c) treating said copper ion capturing group-containing substrate with a source of copper ion and a sulfidizing agent to form copper sulfide bound to said substrate.

In another aspect, the present invention provides an electrically conducting material, comprising a polyester substrate having a surface provided with a multiplicity of fine depressions, copper ion capturing groups chemically bound to the inside surfaces of said fine depressions, and copper sulfide bound to said substrate through the copper ion capturing groups.

The present invention will now be described in detail below.

The term "substrate" used in the present specification is intended to refer to a shaped body such as fiber, thread, woven or non-woven fabric, film, sheet, block, plate, pipe or receptacle.

The term "polyester substrate" is intended to mean a substrate whose major component is a polyester. Thus, not only a substrate composed substantially only of a polyester but also a substrate formed of a mixture or a copolymer containing at least 50% by weight of a polyester may be used for the purpose of the present invention.

Any polyester inclusive of aromatic and aliphatic polyesters may be used in the present invention. Polyesters obtained from a dicarboxylic acid, such as terephthalic acid, naphthalene dicarboxylic acid, an aliphatic, long chain dicarboxylic acid or a mixture thereof, and a glycol such as ethylene glycol or butylene glycol are typical examples of polyesters. For the purpose of imparting to a polyester substrate a specific function or property, such as deep color, sweat absorbing property, pill preventing property or specific color forming property, a modifying agent may be incorporated into the substrate by admixing or copolymerizing with the polyester. Examples of modifying agents for copolymerization include 3,5-di(carbomethoxy)benzenesulfonic acid metal salts, isophthalic acid, p-hydroxybenzoic acid, methoxypolyethylene glycol and pentaerythritol. Examples of modifying agents for admixture include metal salts of dimethyl terephthalate, aromatic and aliphatic carboxylic acids and inorganic acids (e.g. sulfuric acid, silicic acid and carbonic acid). The metal salts may be alkali metal salts and alkaline earth metal salts. Functional polyester fibers are suitable examples of polyester substrates in the present invention.

In the process for the production of an electrically conducting polyester material according to the present invention, the polyester substrate is first treated with an aqueous alkali solution to dissolve a portion of the polyester substrate into the solution. As a result of the dissolution of the polyester and/or additives constituting the substrate, a multiplicity of very small depressions or cracks are formed on the surface of the substrate. Since a copper sulfide-containing, electrically conductive layer is formed inside of these depressions and cracks as described hereinafter and is tightly bound to the substrate, the electrically conducting material of the present invention is very stable and exhibits excellent conductivity for a long period of use.

The aqueous alkali solution is preferably an aqueous solution containing 0.005-3% by weight, more preferably 0.01-2 % by weight, of an alkali metal hydroxide (e.g. sodium hydroxide, potassium hydroxide or lithium hydroxide), an alkali metal carbonate (e.g. sodium carbonate) or an alkali metal silicate (e.g. sodium silicate). It is preferred that the aqueous alkali solution contain a surfactant, more preferably a cationic surfactant such as an alkyl quaternary ammonium salt (e.g. lauryltrialkylammonium halide), for reasons of facilitating the dissolution of the substrate. The surfactant is used in an amount of 0.005-2% by weight, preferably 0.01-1% by weight, based on the aqueous alkali solution.

The treatment of the polyester substrate with the aqueous alkali solution is preferably performed by heating the substrate, immersed in the aqueous alkali solution, at a temperature of 70°-140° C., more preferably 90°-120° C., to facilitate the dissolution of the substrate. A pressurized condition is used when the temperature exceeds 100° C. The treatment time is generally 10-100 minutes. The aqueous alkali solution is generally used in an amount of 5-300 parts by weight, preferably 10-200 parts by weight, per 1 part by weight of the polyester substrate.

It is important that the treatment of the polyester substrate with the aqueous alkali solution be performed so that 0.3-30% by weight of the polyester substrate is dissolved. A weight reduction of less than 0.3% by weight is insufficient to improve the stability such as washability of the final product. On the other hand, when the weight reduction exceeds 30% by weight, the mechanical strengths of the polyester substrate are deteriorated. The weight reduction is preferably 0.5-20% by weight.

The thus treated polyester substrate is then reacted with a compound containing a group which can capture copper ion to obtain a copper ion capturing group-containing substrate. Examples of such copper ion capturing groups include a cyano group (—CN), an amino group (—NH$_2$), a mercapto group (—SH), a thiocarbonyl group (—CS—), an isocyanate group (—NCO) and a quaternary ammonium group (—NR$^1$R$^2$R$^3$ X wherein R$^1$, R$^2$ and R$^3$ stand for hydrocarbyl groups such as alkyl, aryl and aralkyl and X stands for an anion such as chlorine ion or sulfate ion). Various known methods may be used for the introduction of such copper ion capturing groups into the polyester substrate. Suitable such methods are described in U.S. Pat. No. 4,690,854, the disclosure of which is hereby incorporated by reference. Silane coupling agents, titanium coupling agents and aluminum coupling agents which contain the above copper ion capturing group are suitably used for the introduction of such groups into the polyester substrate. The amount of the copper ion capturing group-containing compound bound to the surface-treated polyester substrate is generally 0.05-15% by weight, preferably 0.1-10% by weight, based on the weight of the surface-treated polyester substrate.

The thus obtained copper ion capturing group-containing substrate is next treated with a source of copper ion and a sulfidizing agent to form copper sulfide bound to the substrate. The amount of copper sulfide bound to the polyester substrate is variable according to the object of the end use of the electrically conducting material. The amount of copper sulfide is generally 0.5-30% based on the weight of the polyester substrate. The treatment with the sulfidizing agent may be separate from and subsequent to the treatment with the source of copper ion (two-step process) or may be simultaneous with the source of copper ion (one-step process).

In the two-step process, the substrate is first treated with a first, copper ion-containing bath to absorb copper ion thereon. The copper ion-captured substrate is then treated with a second, sulfidizing bath to convert the captured copper ion into copper sulfide. The copper ion in the first bath may be cupric or cuprous ion and is suitably selected depending upon affinity to the copper ion capturing group bound to the substrate. For example, when cyano groups are used as the copper ion capturing groups, the first bath should contain cuprous ion.

As the source of cuprous ion, a cuprous salt such as cuprous chloride or cuprous bromide may be used. Alternatively, a combination of a divalent copper compound and a reducing agent capable of converting the divalent copper compound into cuprous ion is also suitably used. Illustrative of suitable divalent copper compounds are cupric sulfate, cupric chloride, cupric nitrate, cupric bromide and cupric acetate. Illustrative of suitable reducing agents are metallic copper, hydroxylamine sulfate, hydroxylamine hydrochloride, ferrous sulfate, sodium pyrosulfite, sodium hydrogen sulfite and sodium hypophosphite.

The amount of copper ion in the first bath is generally 1-40% by weight, preferably 3-30% by weight, based on the copper ion capturing group-containing substrate. The first step is preferably performed at an elevated temperature, more preferably at 80°-110° C., for 30-120 minutes.

The sulfidizing agent is a sulfur-containing compound capable of providing sulfur atoms and/or sulfur ions for reaction with the copper ion to form copper sulfide bound to the polyester substrate and may be, for example, sodium sulfide, potassium thiosulfate, sodium thiosulfate, dithionous acid, sodium dithionite, sodium formaldehyde sulphoxylate (Rongalite C) or zinc formaldehyde sulphoxylate (Rongalite Z). The second step is also preferably performed at an elevated temperature, more preferably 80°-110° C., for 30-120 minutes.

In the one-step process, the copper ion capturing group-containing substrate is immersed in a bath containing the source of copper ion and the sulfidizing agent. The second step is preferably performed at 20°-100° C. for 1-8 hours. The source of copper ion is similar to that described above with regard to the two-step process. The amount of copper ion in the bath is generally 0.02-40% by weight, preferably 0.2-30% by weight, based on the copper ion capturing group-containing substrate. A water-soluble thiosulfate such as sodium thiosulfate is suitably used as the sulfidizing agent. The concentration of the thiosulfate in the bath is generally 0.02-40% by weight, preferably 0.2-30% by weight.

It is preferred that the bath for the one-step process have a pH of 1.5-4.5. For controlling the pH, an acid such as citric acid, tartaric acid, acetic acid or sulfuric acid and an alkali such as sodium citrate, sodium tartarate or sodium secondary phosphate may be used.

For the purpose of improving stability or color tone of the electrically conducting material, it is preferred that at least one auxiliary metal sulfide be bound to the polyester substrate together with the copper sulfide. The metal of the auxiliary metal sulfide is selected from Ag, Pd, Au, Ru, Rh, Os, Ir, Pt, Fe, Co, Ni, Bi, Zn, In, V, Si, Sb, Al, Mn, Rb, Li, Tl, W, Ti, Cr, Mo, Y, Ge, Yb, La, Sm, Be, Sn, Zr, Mg, Ba, Nd, Cd and Ga. The amount of the auxiliary metal sulfide is such as to provide an atomic ratio M/Cu of in the range of 0.001-1.0, where M stands for the auxiliary metal.

Such an auxiliary metal sulfide may be incorporated into the electrically conducting material by treating the copper ion capturing group-containing substrate with a source of auxiliary metal ion. Examples of the sources of the auxiliary metal ion include sulfates, nitrates, chlorides, acetates and fluorides of the auxiliary metals. This treatment may be simultaneous with the above-described treatment with the source of copper ion or subsequent to the above-described treatment for sulfidizing copper ion. In the latter case, the treatment with the source of auxiliary metal ion is preferably combined with a treatment with a thiosulfate. The technique for the incorporation of the auxiliary metal sulfide into a copper sulfide-containing electrically conducting material is disclosed in, for example, U.S. patent application Ser. No. 07/744,398 (corresponding to European Patent Publication EP-A-0503189), now U.S. Pat. No. 5,269,973, the disclosure of which is hereby incorporated by reference.

In the electrically conducting material obtained by the process of the present invention, the copper sulfide-containing conductive layer is bound to the inside surfaces of the fine depressions or cracks of the polyester substrate. Therefore, the electrically conducting material can retain its conductivity even when subjected to repeated washing and abrasive conditions.

The following examples will further illustrate the present invention. Parts are by weight.

EXAMPLE 1

A polyester (terephthalic acid-ethylene glycol polyester) spun thread having was washed with water containing 2 g/liter of an anionic surfactant (Tripon A manufactured by Ipposha Yushi Kogyo K. K.) at 60° C. for 15 minutes, then rinsed and dried.

Alkali Treatment

The washed thread was treated with an aqueous bath containing 3 g/liter of sodium hydroxide, 1 g/liter of a cationic surfactant (quaternary alkyl ammonium salt, Marcerin REF manufactured by Meisei Kagaku Kogyo K. K.) at 110° C. for 40 minutes. The weight ratio of the thread to the bath was 1:20. The thus treated thread was rinsed with water and dried. The weight of the thread was found to be decreased by 4.8% $((W_0-W_1)/W_0 \times 100$ wherein $W_0$ and $W_1$ represent the weights of the thread before and after the alkali treatment) as a result of the alkali treatment.

Introduction of Copper Ion Capturing Groups

The alkali-treated polyester thread was then treated with an aqueous bath consisting of 10 parts of 3-mercaptopropyltrimethoxysilane, 4 parts of the above-mentioned surfactant (Tripon A) and 300 parts of water at 100° C. for 1 hour with a weight ratio of the thread to the bath of 1:20. The treated thread was then rinsed with water and dried.

Sulfidization

The mercapto group-containing thread (100 parts) was then treated with an aqueous bath (2,000 parts) containing 20 parts of cupric sulfate, 10 parts of citric acid, 20 parts of sodium thiosulfate, 20 parts of sodium secondary phosphate, 10 parts of sodium bisulfite and 0.3 part of silver nitrate (balance being water) at 60° C. for 2 hours. The weight of the thread was found to be increased by 5.6% $((W_3-W_2)/W_2 \times 100$ wherein $W_2$ and $W_3$ represent the weights of the thread before and after the sulfidization treatment) as a result of the sulfidization treatment.

Comparative Example 1

Example 1 was repeated in the same manner as described except that the alkali treatment was omitted. The weight of the thread was found to be increased by 4.6% as a result of the sulfidization treatment.

EXAMPLE 2

Example 1 was repeated in the same manner as described except that an alkali treatment bath having a sodium hydroxide concentration of 6 g/liter was used. The weight of the thread was found to be decreased by 12.1% as a result of the alkali treatment. The weight of the thread was found to be increased by 5.8% as a result of the sulfidization treatment.

EXAMPLE 3

Example 1 was repeated in the same manner as described except that an anti-pilling spun polyester thread (T-266 manufactured by Toray Co., Ltd.) was used as a polyester substrate and that an alkali treatment bath having a sodium hydroxide concentration of 5 g/liter was used. The weight of the thread was found to be decreased by 12.4% as a result of the alkali treatment. The weight of the thread was found to be increased by 5.7% as a result of the sulfidization treatment.

EXAMPLE 4

Example 1 was repeated in the same manner as described except that a sweat-absorbing polyester spun thread (WELKY manufactured by Teijin Co., Ltd.) was used as a polyester substrate and that an alkali treatment bath having a sodium hydroxide concentration of 2.5 g/liter was used. The weight of the thread was found to be decreased by 4.05% as a result of the alkali treatment. The weight of the thread was found to be increased by 5.8% as a result of the sulfidization treatment.

Comparative Example 2

Example 4 was repeated in the same manner as described except that the alkali treatment was omitted. The weight of the thread was found to be increased by 4.4% as a result of the sulfidization treatment.

EXAMPLE 5

Example 4 was repeated in the same manner as described except that the sulfidization treatment was performed as follows. The alkali-treated thread (100 parts) was first treated with a first bath (2,000 parts) containing 20 parts of cupric sulfate and 15 parts of hydroxyamine hydrochloride (balance being water) at 100° C. for 1 hour, then treated with a second bath (2,000 parts) containing 15 parts of sodium dithionite (balance being water) at 100° C. for 1 hour, and was finally treated with a third bath (2,000 parts) containing 0.3 part of silver nitrate (balance being water) at 50° C. for 30 minutes. The weight of the thread was found to be increased by 5.1% as a result of the sulfidization treatment.

Washability Test

The electrically conducting thread obtained in the foregoing examples was tested for washability. Thus, a sample thread was sewed in a polyester fabric and the resulting fabric was washed with water containing 2 g/liter of a commercially available detergent (NEW BEAD manufactured by Kao Co., Ltd.) using an electric washing machine. The weight ratio of the fabric to the washing water was 1:30. Washing was carried out at 40° C. for 5 minutes, followed by dehydration. This was then washed with clean water for 2 minutes and the washed fabric was dried. The above procedure consisting of washing with detergent water, dehydration, washing with water and drying was repeated a number of times. The washability of the sample thread was evaluated by measuring the electrical resistance (kΩ) in 1 cm length of the sample. The results are shown in Table 1.

TABLE 1

| Example | 1 | | 2 | 3 | 4 | | 5 |
| Comptv. | | 1 | | | | 2 | |
| Number of Washes | | | | | | | |
| --- | --- | --- | --- | --- | --- | --- | --- |
| 0 | 1.1 | 1.1 | 1.0 | 1.1 | 1.0 | 1.1 | 1.2 |
| 5 | 1.1 | 1.32 | 1.1 | 1.1 | 1.0 | 1.41 | 1.2 |
| 10 | 1.1 | — | 1.1 | 1.1 | 1.0 | — | 1.2 |
| 20 | 3.8 | | 1.1 | 1.1 | 1.0 | | 1.2 |
| 30 | 11.0 | | 1.6 | 1.2 | 1.0 | | 1.2 |
| 40 | 28.5 | | 5.6 | 1.8 | 1.1 | | 1.2 |
| 50 | — | | 18.2 | 3.2 | 1.1 | | 1.3 |
| 60 | | | 35.0 | 8.2 | 1.1 | | 1.3 |
| 70 | | | — | 16.6 | 1.1 | | 1.3 |
| 80 | | | | — | 1.1 | | 1.3 |
| 90 | | | | | 1.1 | | 1.3 |
| 100 | | | | | 1.1 | | 1.3 |

EXAMPLE 6

A polyester (terephthalic acid-ethylene glycol polyester) film was washed with water containing 2 g/liter of an anionic surfactant (Tripon A manufactured by Ipposha Yushi Kogyo K. K.) at 60° C. for 15 minutes.

The washed polyester film was then treated with an aqueous bath containing 0.5 g/liter of sodium hydroxide, 0.5 g/liter of a cationic surfactant (Marcerin REF manufactured by Meisei Kagaku Kogyo K. K.) at 110° C. for 40 minutes. The weight ratio of the film to the bath was 1:200. The thus treated film was rinsed with water and dried. The weight of the film was found to be decreased by 5.2% as a result of the alkali treatment.

The alkali-treated polyester film (100 parts) was treated with an aqueous bath (20,000 parts) consisting of 1 part of 3-mercaptopropyl-trimethoxysilane and 0.5 part of the abovementioned surfactant (Tripon A) and balance of water at 100° C. for 1 hour with a weight ratio of the film to the bath of 1:200. The treated film was then rinsed with water and dried.

The mercapto group-containing film (100 parts) was then treated with an aqueous bath (20,000 parts) containing 5 parts of cupric sulfate, 3 parts of citric acid, 5 parts of sodium thiosulfate, 9 parts of sodium secondary phosphate and 5 parts of sodium bisulfite (balance being water) at 60° C. for 3 hours. The weight of the film was found to be increased by 1.38% as a result of the sulfidization treatment.

The thus obtained electrically film was applied with a pressure-sensitive adhesive tape. The tape was then peeled away and the surface resistivity (ohm) in 1 cm length of the exposed surface was measured. The surface resistivity of the film was found to remain unchanged (460 ohms) after the test.

Comparative Example 3

Example 6 was repeated in the same manner as described except that the alkali treatment was omitted. The weight of the film was found to be increased by 1.12% as a result of the sulfidization treatment. The electrically conducting film was subjected to the same test as in Example 6. The surface resistivity was 520 ohms before the test but was infinite (unmeasurable) after the test. The conducting layer is considered to have been partly peeled away together with the adhesive tape.

EXAMPLE 7

Example 4 was repeated in the same manner as described except that 3-mercaptopropyltrimethoxysilane was replaced by N-β(aminoethyl)-γ-aminopropyltripmethoxysilane. The weight of the thread was found to be increased by 5.75% as a result of the sulfidization treatment. The resulting electrically conducting thread was found to exhibit good washability.

EXAMPLE 8

Example 4 was repeated in the same manner as described except that 3-mercaptopropyltrimethoxysilane was replaced by 3-isocyanatopropyltripmethoxysilane. The weight of the thread was found to be increased by 5.80% as a result of the sulfidization treatment. The resulting electrically conducting thread was found to exhibit good washability.

What is claimed is:

1. A process for the preparation of an electrically conducting material, comprising the steps of:

(a) treating a polyester substrate with an aqueous alkali solution to dissolve a portion of the polyester substrate into said solution and to obtain a treated substrate, said aqueous alkali solution containing 0.005–3% by weight of at least one member selected from the group consisting of alkali hydroxides, alkali carbonates and alkali silicates;
    (b) reacting said treated substrate with a compound containing a group which can capture copper ion to obtain a copper ion capturing group-containing substrate, and
    (c) treating said copper ion capturing group-containing substrate with a source of copper ion and a sulfidizing agent to form copper sulfide bound to said substrate.

2. A process as claimed in claim 1, wherein step (a) is performed so that 0.3–30% by weight of said polyester substrate is dissolved.

3. A process as claimed in claim 1, wherein step (c) further includes treating said copper ion capturing group-containing substrate with a source of at least one auxiliary metal ion selected from the group consisting of Ag, Pd, Au, Ru, Rh, Os, Ir, Pt, Fe, Co, Ni, Bi, Zn, In, V, Si, Sb, Al, Mn, Rb, Li, Tl, W, Ti, Cr, Mo, Y, Ge, Yb, La, Sm, Be, Sn, Zr, Mg, Ba, Nd, Cd and Ga.

4. A process as claimed in claim 1, wherein said aqueous alkali solution contains a surfactant.

5. A process as claimed in claim 1, wherein step (a) is performed at a temperature of 70°–140° C.

6. A process as claimed in claim 1, wherein said copper ion capturing group is a group selected from the group consisting of a cyano group, an amino group, a mercapto group, a thiocarbonyl group, an isocyanate group and a quarternary ammonium group.

7. A process as claimed in claim 1, wherein the treatment with the sulfidizing agent is separate from and subsequent to the treatment with the source of copper ion.

8. A process as claimed in claim 1, wherein the treatment with the source of copper ion and with the sulfidizing agent is within the same treatment bath and wherein said sulfur-containing compound is a thiosulfate.

9. An electrically conducting material obtained by the process according to claim 1.

10. An electrically conducting material, comprising a polyester substrate having a surface provided with a multiplicity of fine depressions, copper ion capturing groups chemically bound to the inside surfaces of said fine depressions, and copper sulfide bound to said substrate through the copper ion capturing groups.

11. A material as claimed in claim 10, wherein said copper ion capturing group is a group selected from the group consisting of a cyano group, an amino group, a mercapto group, a thiocarbonyl group, an isocyanate group and a quarternary ammonium group.

12. A material as claimed in claim 10, further comprising at least one auxiliary metal sulfide bound to said substrate together with said copper sulfide and selected from the group consisting of sulfides of Ag, Pd, Au, Ru, Rh, Os, Ir, Pt, Fe, Co, Ni, Bi, Zn, In, V, Si, Sb, Al, Mn, Rb, Li, Tl, W, Ti, Cr, Mo, Y, Ge, Yb, La, Sm, Be, Sn, Zr, Mg, Ba, Nd, Cd and Ga.

* * * * *